United States Patent [19]

Harris et al.

[11] Patent Number: 5,232,732
[45] Date of Patent: Aug. 3, 1993

[54] DRY SOUP MIX

[75] Inventors: Norman E. Harris, Waltham; Betty A. Davis, Natick, both of Mass.

[73] Assignee: The United States of America as represented by the Secretary of the Army, Washington, D.C.

[21] Appl. No.: 824,958

[22] Filed: Jan. 23, 1992

[51] Int. Cl.$^5$ ................................................ A23L 1/39
[52] U.S. Cl. .................................. 426/589; 426/650; 426/804; 426/810
[58] Field of Search ............... 426/589, 658, 650, 804, 426/810

[56] References Cited

U.S. PATENT DOCUMENTS

| | | | |
|---|---|---|---|
| 3,433,650 | 3/1969 | Block et al. | 426/589 |
| 3,563,768 | 2/1971 | Melnick | 426/589 |
| 3,752,677 | 8/1973 | Andrews | 426/589 |
| 3,821,435 | 6/1974 | Blake et al. | 426/589 |
| 3,987,207 | 10/1976 | Spaeti | 426/589 |
| 4,578,274 | 3/1986 | Sugisawa | 426/589 |
| 4,917,913 | 4/1992 | Buckholz, Jr. et al. | 426/536 |
| 4,960,603 | 10/1990 | Buckholz, Jr. et al. | 426/536 |
| 4,966,783 | 10/1990 | Buckholz, Jr. et al. | 426/565 |
| 4,988,532 | 1/1991 | Buckholz, Jr. et al. | 426/594 |

*Primary Examiner*—Jeanette Hunter
*Attorney, Agent, or Firm*—Richard J. Donahue

[57] ABSTRACT

A dry soup mix adapted to be combined with water and residual food items in field ration tray packs to provide a soup, the soup mix comprising a uniformly blended and free flowing mix of substantially dry edible components, the mix being adapted to pass through a U.S. Standard No. 5 sieve, having a moisture content of not greater than 5% by weight, and having a salt content of not greater than 6% by weight, and the mix comprising a selected one of two groups of components, the first of the groups comprising about 22-26% beef related components and the second of the groups comprising about 38-43.5% chicken related components.

2 Claims, 1 Drawing Sheet

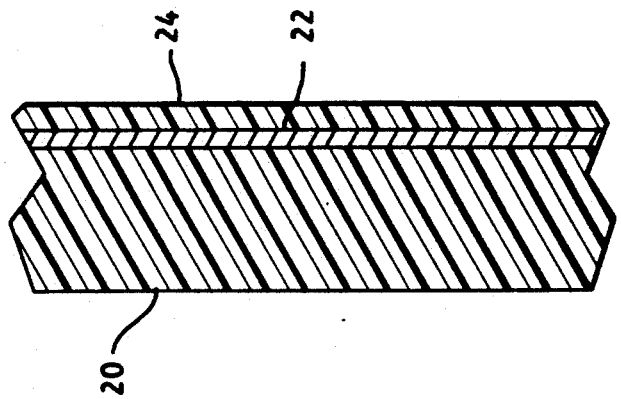
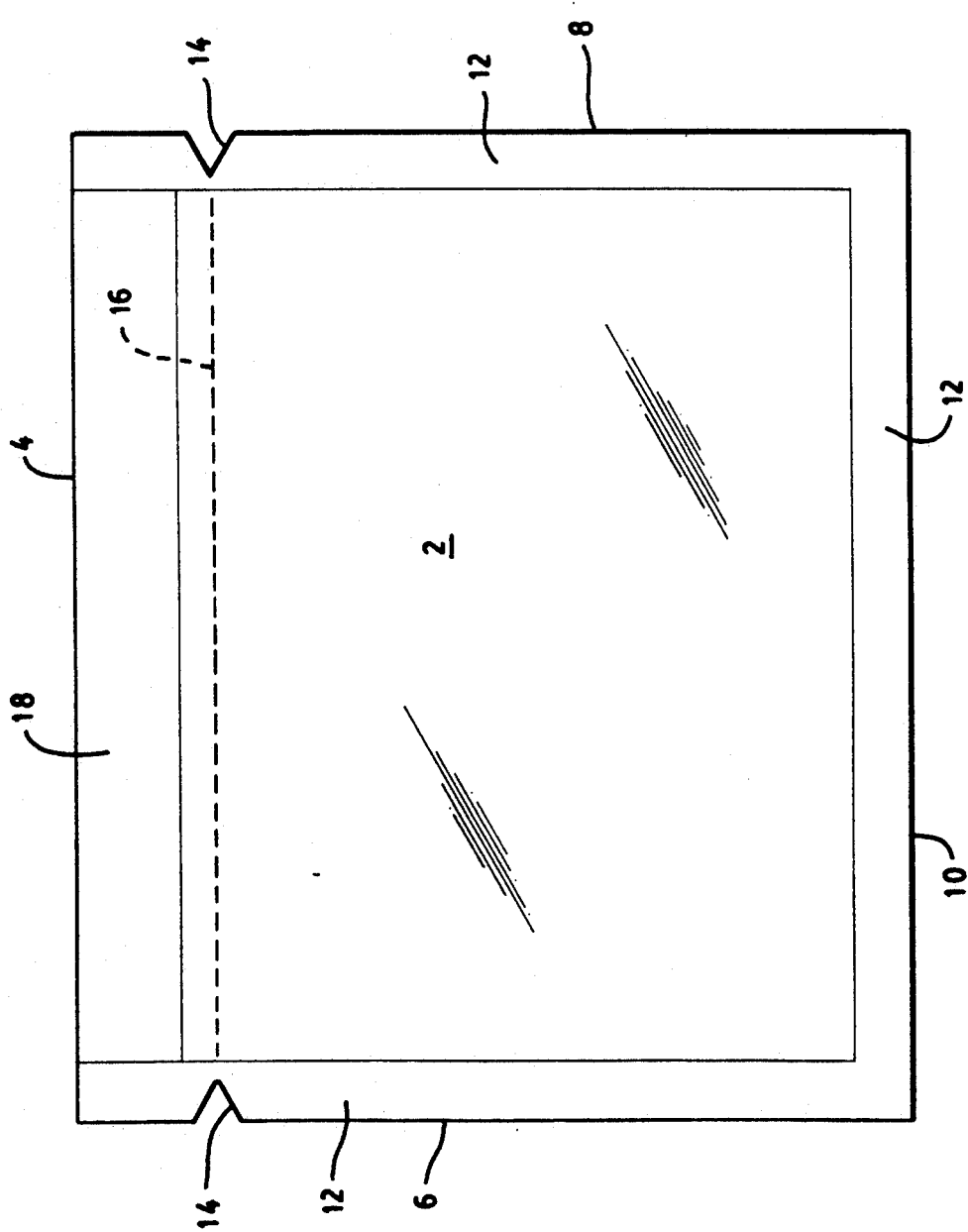

DRY SOUP MIX

STATEMENT OF GOVERNMENT INTEREST

The invention described herein may be manufactured, used and licensed by or for the Government for Governmental purposes without the payment to us of any royalty thereon.

BACKGROUND OF THE INVENTION

1. Field of the Invention

This invention relates to foodstuffs for military field operations, and is directed more particularly to a dry powdered soup mix adapted to be mixed with water and edibles available from unused tray packs to provide wholesome and flavorful soup.

2. Description of the Prior Art

The U.S. Army uses as a field ration an 18 or 36 person tray pack meal module, typically used in a Mobile Kitchen Trailer supporting multiple remote sites. It often happens that there are excess, or residual, tray packs which include vegetables and, to a lesser extent, starches and entrees, which can be used as soup ingredients. The addition of wholesome and flavorful soup, which may be served with a meal, or as a warming beverage, will encourage consumption of the residual pans of vegetables and other foods.

To facilitate preparation of such soup at a field kitchen, there is a need for soup starters of two types. One of the types of soup starters that would be beneficial in such circumstances is a beef base starter, and the other is a chicken base starter. In keeping with health requirements, the starter should be of relatively low sodium content.

It is commonly known to reduce sodium chloride (salt) in soups and other foods by the substitution of potassium chloride. The latter is bitter in flavor and reduces the acceptance of the product. Formulating low and reduced sodium products continues to be a problem because of the difficulty of developing low sodium content foods having taste comparable to those with higher levels of sodium. Low and reduced sodium products are defined in 21 C.F.R. 101.13, which relates to sodium labeling. "Low sodium" may be used on the label of foods that contain 140 mgs. or less of sodium per serving. "Reduced sodium" may be used on the label of foods when there is a 75% reduction in sodium.

SUMMARY OF THE INVENTION

Accordingly, an object of the present invention is to provide a dry soup unit having a soup mix of low salt content, low moisture content, in free-flowing powder form, and adapted to be mixed with hot water and residual food items to provide a wholesome and flavorful soup in field conditions.

A further object is to provide an alternative group of food components for the mix, including a beef related group and a chicken related group.

With the above and other objects in view, as will hereinafter appear a feature of the present invention is the provision of a dry soup mix adapted to be combined with water and residual food items in field ration tray packs to provide a soup, the soup mix comprising a uniformly blended and free flowing mix of substantially dry edible components, the mix being adapted to pass through a U.S. Standard No. 5 sieve, having a moisture content of not greater than 5% by weight, and having a salt content of not greater than 6% by weight, and the mix comprising a selected one of two groups of components, the first of the groups comprising about 22–26% beef related components and the second of the groups comprising about 38–43.5% chicken related components.

The above and other features of the invention, including various novel details of construction and combinations of components, will now be more particularly described with reference to the accompanying drawings and pointed out in the claims. It will be understood that the particular dry mix embodying the invention is described by way of illustration only and not as a limitation of the invention. The principles and features of this invention may be employed in various and numerous embodiments without departing from the scope of the invention.

BRIEF DESCRIPTION OF THE DRAWINGS

Reference is made to the accompanying drawings in which is shown an illustrative embodiment of the invention, from which its novel features and advantages will be apparent.

In the drawings:

FIG. 1 is a plan view of an envelope adapted to retain the dry mix; and

FIG. 2 is a diagrammatic sectional depiction of the laminate material from which the envelope is formed.

DESCRIPTION OF THE PREFERRED EMBODIMENTS

The illustrative dry soup unit includes a selected one of two groups of food components, each of which imparts a selected flavor to residual field ration vegetables when the mix and the vegetables are added to boiling water. The mix is uniformly blended, free flowing, and of substantially dry edible components, the moisture content being not greater than 5% by weight. The mix is adapted to pass through a U.S. standard No. 5 sieve. The mix is provided with a salt content of not greater than 6% by weight.

A first of the two groups of food components is a beef oriented group having therein about 22–26% beef-related components. In the beef oriented group, it is preferred that the beef-related components include, by weight, beef flavored hydrolyzed vegetable protein 14–16%, beef extract 7–8%, and beef flavoring 1–2%. In a preferred embodiment, the beef-related components are present in the mix, by weight: beef hydrolyzed vegetable protein about 14.9%, beef extract about 7.5%, and beef flavoring about 1.4%.

In a preferred embodiment, the first group comprises:

|  | Percent by weight |
|---|---|
| Sugar | 15.6 (±5.0) |
| Flavoring, celery, soluble | 15.6 (±5.0) |
| Autolyzed yeast | 14.9 (±1.0) |
| Hydrolyzed vegetable protein, beef | 14.9 (±1.0) |
| Starch, instant, modified, cornstarch | 9.7 (±0.1) |
| Spice blend | 8.4 (±1.0) |
| Beef extract | 7.5 (±0.5) |
| Monosodium glutamate | 4.3 (±0.1) |
| Hydrogenated vegetable shortening | 3.8 (±0.2) |
| Color, caramel | 1.9 (±0.1) |
| Silicon dioxide | 1.9 (±0.1) |
| Flavoring beef, natural or roasted | 1.4 (±0.1) |
| Disodium inosinate and disodium guanylate | 0.1 (±0.05) |

The sugar is white, refined, granulated fine grade cane or beet sugar, or a combination thereof.

The soluble celery flavoring is prepared by blending and dispersing a minimum of 4.0 percent of total extractives of the dried seed of *Apium craveolens L.* on a soluble, dry edible carrier. The flavoring possesses a clean celery-like aroma with a slightly bitter taste. The flavoring is free-flowing and free of caking.

The autolyzed yeast is an extract prepared from whole fresh *Saccharomyces cerevisiae* or *Saccharomyces carlbercensis* by the action of those proteolytic enzymes naturally present in the fresh yeast. The typical analyses of this yeast is as follows:

|  | Percent |
| --- | --- |
| Chloride, as NaCl | Not more than 3.0 |
| Total nitrogen (salt-free solids basis) | Not less than 10.0 |
| Protein | Not less than 25.0 |
| Moisture | Not more than 7.0 |

The hydrolyzed vegetable protein for beef is obtained either by hydrolysis or nonhydrolysis of any one or any combination of corn, soybean, wheat, or yeast proteins from which none of the MSG has been extracted during processing, and it has a characteristic odor and flavor. The salt content is not less than 4.0 percent or more than 16.0 percent.

The starch is an instant modified cornstarch that disperses readily in hot water. The starch has a maximum moisture content of 13.0 percent.

The spice blend preferably comprises the following ingredients:

| Ingredient | Percent by weight |
| --- | --- |
| Onion powder | 95.38 (±1.0) |
| Garlic powder | 1.74 (±0.1) |
| Pepper, white, ground | 1.33 (±0.1) |
| Rosemary, ground | 0.40 (±0.05) |
| Thyme, ground | 0.20 (±0.05) |
| Turmeric, ground | 0.20 (±0.05) |
| Clove, ground | 0.13 (±0.05) |
| Other spices, including chili, leek, horseradish and Jalapeno pepper | 0.625 (±0.375) |

The "other spices" included in the spice blend contribute significantly to the acceptance of the mix despite the reduced levels of sodium chloride and the absence of potassium chloride. The "other spices" are "hot" spices having Scoville units in the range of 1,500–20,000. "Scoville units" defines the heat value as determined by the American Spice Trade Association by high pressure liquid chromatography. The "other spices" are used in the form of a powder adapted to pass through a U.S. Standard No. 30 sieve.

The beef extract has a characteristic flavor and odor and does not contain a trace of nitrites or nitrates. The typical analysis of this extract is as follows:

|  | Percent |
| --- | --- |
| Moisture | Not more than 18.0 |
| Ash | Not more than 25.0 |
| Chloride, as NaCl | Not more than 5.0 |
| Total creatine and creatinine | Not less than 7.0 |
| Total nitrogen | Not less than 8.0 |

The monosodium glutamate complies with the Food Chemicals Codex.

The hydrogenated vegetable shortening is refined hydrogenated vegetable oil of 100 hours or greater stability. In addition, the shortening contains at least one antioxidant.

The caramel color complies with the Food Chemicals Codex and is a dry, soluble sucrose carrier.

The silicon dioxide complies with the Food Chemicals Codex.

The natural or roasted beef flavoring is a light brown, free-flowing powder made from beef and other natural flavorings to provide cooked, roast beef characteristics. The moisture content is not more than 8.0 percent.

The disodium inosinate and the disodium guanylate comply with the Food Chemicals Codex.

A second of the two groups of food components is a chicken oriented group having therein about 38–43.5% chicken-related components. In the chicken oriented group, it is preferred that the chicken-related components include, by weight, rendered chicken fat 19–20%, chicken flavoring 8.5–9.5%, powdered chicken fat 4.5–5.5%, chicken hydrolyzed vegetable protein 4.5–5.5%, chicken base soup broth 1–2%, and dried chicken meat solids 0.5–1.0%. In a preferred embodiment, the chicken-related components are present in the mix by weight: rendered chicken fat about 19.3%, chicken flavoring about 9.0%, powdered chicken fat about 5.1%, chicken hydrolyzed vegetable protein about 5.1%, chicken base soup broth about 1.5%, and dried chicken meat solids about 0.8%.

In a preferred embodiment, the second group comprises:

| Ingredient | Percent by weight |
| --- | --- |
| Fat, chicken, rendered | 19.32 (±5.0) |
| Starch, instant, modified, cornstarch | 18.30 (±5.0) |
| Spice blend | 11.71 (±1.0) |
| Maltodextrin | 11.05 (±1.0) |
| Sugar, white, Baker's fine | 10.17 (±1.0) |
| Flavoring, chicken, natural or artificial | 9.02 (±1.0) |
| Fat, chicken powder | 5.10 (±1.5) |
| Hydrolyzed vegetable protein, chicken | 5.10 (±1.5) |
| Monosodium glutamate | 5.10 (±1.5) |
| Silicon dioxide | 1.93 (±0.1) |
| Soup broth, chicken base | 1.53 (±0.1) |
| Meat solids, chicken, dried | 0.80 (±0.05) |
| Turmeric, ground | 0.40 (±0.05) |
| Pepper, red, ground (cayenne) | 0.20 (±0.05) |
| Disodium inosinate and disodium guanylate | 0.10 (±0.05) |
| L-Cysteine monohydrochloride | 0.10 (±0.05) |
| Garlic powder | 0.05 (±0.01) |
| Color, yellow, No. 5 | 0.02 (±0.005) |

The rendered chicken fat has a clear, yellow color and a characteristic mild chicken fat odor and flavor. The fat contains USDA approved antioxidants. The chicken fat has a peroxide value not to exceed 15 meq./kg. The chicken fat shall have been held at 0° F. or lower for a period not to exceed 75 days prior to product preparation.

The starch is the same as the above-described starch used in the beef-related group.

The maltodextrin is a bland, white carbohydrate. It has a dextrose equivalent of 13.0 to 17.0, and a maximum moisture of 6.0 percent. The maltodextrin is readily soluble and resistant to caking.

The sugar is the same as the above-described sugar used in the beef-related group.

The chicken flavoring, natural or artificial, is a light yellow, free flowing powder made from chicken and other natural flavorings to provide cooked chicken characteristics. The flavoring may contain disodium inosinate, disodium guanylate, chicken, and sodium benzoate.

The spice blend preferably shall consist of the following ingredients:

| Ingredient | Percent by weight |
|---|---|
| Onion powder | 93.38 (±1.0) |
| Tarragon, ground | 2.00 (±0.1) |
| Garlic powder | 1.74 (±0.1) |
| Pepper, white, ground | 1.33 (±0.1) |
| Rosemary, ground | 0.40 (±0.05) |
| Turmeric, ground | 0.20 (±0.05) |
| Thyme, ground | 0.20 (±0.05) |
| Clove, ground | 0.13 (±0.05) |
| Other spices, including leek, horseradish and jalapeno peppers | 0.625 (±0.375) |

As in the beef flavored group, the "other spices" noted immediately above have Scoville units in the range of 1,500–20,000, as determined by the American Spice Trade Association and are in powder form, adapted to pass through a No. 30 sieve.

The chicken fat powder shall be similar to the commercial product Beatreme 1375B.

The hydrolyzed vegetable protein for chicken is obtained by the hydrolysis of any one or any combination of corn, soybean, wheat, or yeast proteins from which none of the monosodium glutamate has been extracted during processing, and it has a characteristic odor and flavor. The salt-free solids are not more than 39.0 percent. The salt content is not less than 22.0 percent or more than 50.0 percent.

The monosodium glutamate is as above described relative to the beef oriented group.

The onion powder is "Fancy Grade" of the Official Standards and Methods of the American Dehydrated Onion and Garlic Association for dehydrated Onion and Garlic Products.

The silicon dioxide is as above described relative to the beef oriented group.

The chicken base soup broth is similar to the commercial product of Henningsen Foods, Inc.

The dried chicken meat solids (meat and skin) possesses good flavor and odor, and is reduced to a fine powder to provide proper distribution in the finished product.

The L-Cysteine monohydrochloride complies with the Food Chemicals Codex.

The garlic powder shall be "Fancy Grade" of the Official Standards and Methods of the American Dehydrated Onion and Garlic Association for Dehydrated Onion and Garlic Products.

The above mixes thus contain no potassium chloride and only minor amounts of sodium chloride, but retain taste having acceptance levels comparable to higher sodium mixes. This is achieved by the unique blend of spices which, in combination, impart a salt-like taste. The beef blend, as above described, comports with the requirements for labelling as a "reduced sodium" product, and the chicken blend as a "low sodium" product.

A preferred envelope for packaging the above-described mix is a preformed flat style envelope 2 (FIG. 1) having dimensions of 7 inches by 6 inches, with a 7 inch top edge 4 having therein the opening of the envelope. The empty envelope 2 is made by heat sealing three edges 6, 8, 10 with ⅜ inch wide seals. The heat seals 12 are made in a manner that will ensure hermetic seals and preclude leakage of air into the envelope through the seals, seal junctions or through defects created when the envelopes are filled and sealed. A tear-nick notch 14 and/or serrations 16, at least 1/32 inch deep, located 1 inch from the top edge 4 of the envelope is made in one or both side seals. The distance between the inside edge of the tear-nick notch and the inside edge of the seal is at least ⅛ inch. One side of the open end of the envelope may be provided with an extended or foldover lip (not shown), extending not more than 5/16 inch to facilitate opening and filling. Tear-nick notch location shall be measured from the top of the envelope, excluding the extended or foldover lip.

The preformed envelope is fabricated from 0.002 inch thick ionomer or polyethylene film 20, laminated or extrusion coated to 0.00035 inch thick primed aluminum foil 22, bonded to 0.0005 inch thick polyester 24. The materials are suitably formulated for food packaging and do not impart an odor or flavor to the product being unit packed.

The soup starter is poured into the envelope in a manner to avoid puncturing the envelope material. The filled envelope is then closed with a heat seal 18. The closure seal 18 is not less than 3/16, or more than ¾ inch, wide. If thermal impulse closure seals or a combination of a heated curved bar with thermal impulse closure seal are used, a seal width from ⅛ to 7/16 inch is acceptable. The closure seal does not extend more than ¾ inch below the top edge of the envelope.

The filled envelope does not exceed 7/16 inch in thickness. Each filled envelope weighs about 126 grams, and no less than 124 grams.

In operation, an envelope is torn open on one side at the tear-nick notch, or other serration. The mix is emptied into a gallon of boiling water, in which the mix readily disperses. Residual vegetables and, if available, appropriate residual entrees and/or starches, may be added.

It is to be understood that the present invention is by no means limited to the particular formulation and constructions herein disclosed and/or shown in the drawings, but also comprises any modifications or equivalents within the scope of the claims.

Having thus described our invention, what we claim as new and desire to secure by Letters Patent of the United States is:

1. A dry soup mix adapted to be combined with water and residual food items in field ration tray packs to provide a soup, said soup mix comprising a uniformly blended and free flowing mix of substantially dry edible components, said mix being adapted to pass through a U.S. Standard No. 5 sieve, said mix having a moisture content of not greater than 5% by weight, said mix containing no potassium chloride and having a salt content of not greater than 6% by weight, and said mix comprising a selected one of two groups of components, the first of said groups comprising about 22–26% beef related components, said beef related components comprising beef hydrolyzed vegetable protein, beef extract and beef flavoring, and the second of said groups comprising about 38–43.5% chicken related components, said chicken related components comprising rendered chicken fat, powdered chicken fat, chicken hydrolyzed vegetable protein, chicken base soup broth and dried chicken meat solids;

said beef related components being present in said mix by weight: beef hydrolyzed vegetable protein 14–16%, beef extract 7–8%, and beef flavoring 1–2%;

said soup mix further comprising by weight: sugar 10.6–20.6%, celery flavoring 10.6–20.6%, autolyzed yeast 13.9–15.9%, starch 9.6–9.8%, spice blend 7.4–9.4%, monosodium glutamate 4.2–4.4%, hydrogenated vegetable shortening 3.6–4.0%, vegetable coloring 1.8–2.0%, silicon dioxide 1.8–2.0%, and disodium inosinate and disodium guanylate 0.05–0.15%;

said spice blend comprising onion powder, garlic powder, white ground pepper, ground rosemary, ground thyme, ground turneric, ground clove, and other spices having a heat value of 1,500–20,000 Scoville units; and said other spices comprising at least one spice selected from a group having therein chili, leek, horseradish, and jalapeno pepper.

2. A dry soup mix adapted to be combined with water and residual food items in field ration tray packs to provide a soup, said soup mix comprising a uniformly blended and free flowing mix of substantially dry edible components, said mix being adapted to pass through a U.S. Standard No. 5 sieve, said mix having a moisture content of not greater than 5% by weight, said mix containing no potassium chloride and having a salt content of not greater than 6% by weight, and said mix comprising a selected one of two groups of components, the first of said groups comprising about 22–26% beef related components, said beef related components comprising beef hydrolyzed vegetable protein, beef extract and beef flavoring, and the second of said groups comprising about 38–43.5% chicken related components, said chicken related components comprising rendered chicken fat, chicken flavoring, powdered chicken fat, chicken hydrolyzed vegetable protein, chicken base soup broth and dried chicken meat solids;

said chicken related components being present in said mix by weight: rendered chicken fat 19–20%, chicken flavoring 8.5–9.5%, powdered chicken fat 4.5–5.5%, chicken hydrolyzed vegetable protein 4.5–5.5%, chicken base soup broth 1–2%, and dried chicken meat solids 0.5–1.0%;

said soup mix further comprising by weight: starch 13.3–23.3%, spice blend 10.71–12.71%, maltodextrin 10.05–11.05%, sugar 9.17–11.17%, monosodium glutamate 3.6–6.6%, silicon dioxide 1.83–2.03%, ground turmeric 0.35–0.45%, ground red pepper 0.15–0.25%, disodium inosinate and disodium guanylate 0.05–0.15%, L-cysteine monohydrochloride 0.05–0.15%; garlic powder 0.04–0.06%, and vegetable coloring 0.015–0.025% said spice blend comprising onion powder, garlic powder, white ground pepper, ground rosemary, ground thyme, ground turmeric, ground clove, ground tarragon, and other spices having a heat value of 1,500–20,000 Scoville units; and said other spices comprising at least one spice selected from a group having therein leek, horseradish and jalapeno pepper.

* * * * *